(12) United States Patent
Chen et al.

(10) Patent No.: US 7,596,140 B2
(45) Date of Patent: Sep. 29, 2009

(54) METHODS AND DEVICES FOR CREATING BI-DIRECTIONAL LSPS

(75) Inventors: Feihong Chen, Lowell, MA (US); Hua Autumn Liu, Holmdel, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1166 days.

(21) Appl. No.: 10/613,104

(22) Filed: Jul. 7, 2003

(65) Prior Publication Data

US 2005/0007960 A1    Jan. 13, 2005

(51) Int. Cl.
*H04L 12/28* (2006.01)

(52) U.S. Cl. .................. 370/392; 370/395.21; 370/397; 370/399

(58) Field of Classification Search ................. 370/221, 370/216, 392, 395.21, 397, 399
See application file for complete search history.

(56) References Cited

U.S. PATENT DOCUMENTS

| 6,904,017 B1* | 6/2005 | Meempat et al. ............ 370/238 |
| 2002/0057691 A1* | 5/2002 | Enoki et al. ................. 370/392 |
| 2002/0109879 A1* | 8/2002 | Wing So ...................... 359/118 |
| 2003/0063613 A1* | 4/2003 | Carpini et al. .............. 370/401 |

* cited by examiner

*Primary Examiner*—Wanda Z Russell

(57) ABSTRACT

Bi-directional Label Switched Paths (LSP) are created by bundling a forward and backward LSP. The forward LSP is separately generated from the backward LSP. The so-created, bi-directional LSP can be deleted when delete path requests are generated and received by both the forward and backward LSPs, respectively.

48 Claims, 1 Drawing Sheet

METHODS AND DEVICES FOR CREATING BI-DIRECTIONAL LSPS

BACKGROUND OF THE INVENTION

Multi-Protocol Label Switched (MPLS) networks transfer packets of information using virtual connections referred to as "Label Switched Paths" (LSPs). There exists techniques for creating LSPs within an MPLS network. As is known by those of ordinary skill in the art, MPLS standards necessitate that each LSP operate in a unidirectional manner (e.g., forwards or backwards). There exists a newer standard named Generic MPLS ("GMPLS") which sets forth techniques for creating LSPs in both directions, so-called "bi-directional" LSPs. GMPLS techniques have their drawbacks, however. GMPLS techniques are not compatible with MPLS-based devices because, for example, in GMPLS LSPs for both the forward and backward directions are set up simultaneously using a single request message or the like. In contrast, MPLS-based devices can only create a single LSP in one direction at a time. The inability of MPLS-based devices to set up LSPS in both directions simultaneously prevents them from using GMPLS techniques.

SUMMARY OF THE INVENTION

Bi-directional LSPs can be created, in accordance with the principles of the present invention, by bundling separately created LSPs. Bundling is carried out by creating an LSP in one direction (e.g., forward path) and then creating a separately generated LSP in the opposite direction. The LSP generated in the opposite direction is referred to as a backward path.

In accordance with one embodiment of the invention, a network device is operable to generate and send a backward path request message to a source of a separately generated, initial forward path request message. After sending the backward path request message, the device awaits the receipt of a backward path reservation message from the source. Upon receiving this reservation message, an LSP in the opposite or backward direction is established. Having separately generated and established both a forward and backward LSP, the two LSPs will act as a bi-directional LSP between the device and the source.

In the embodiments just explained, the network device was operating as a destination device. In additional embodiments of the present invention, the network device may act as a source device.

In yet further embodiments of the present invention, backward path parameters (e.g., bi-directional LSP indicator, quality-of-service (QoS) indicator, routing information, etc.) contained in an initial, forward path request message may be used to generate a backward LSP.

DETAILED DESCRIPTION OF THE INVENTION

Figure 1A:
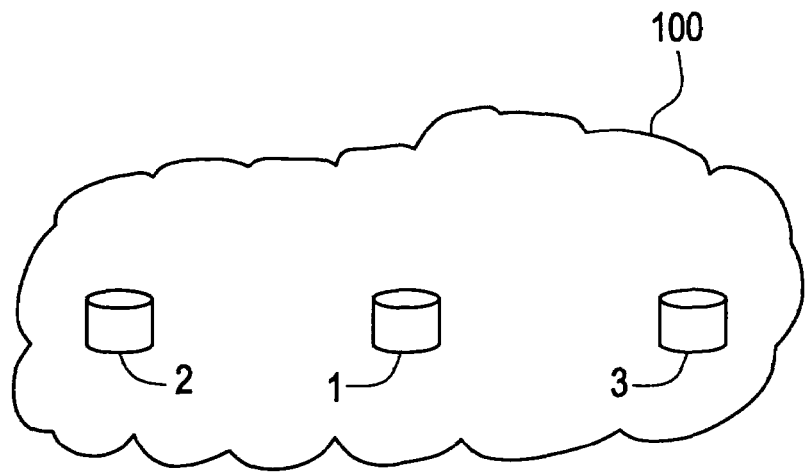
FIG. 1A depicts a number of network devices within a simplified MPLS network.

Referring to FIG. 1A, there is shown an MPLS network 100 which comprises a plurality of MPLS devices 1-3 (e.g., routers, switches, etc.). Devices 1-3 comprise either a source or destination device. In some cases, each device 1-3 may operate as both a source and destination device. It should be understood that, though only 3 devices are shown in FIG. 1A, an MPLS network may contain any number of devices. That is to say, MPLS network 100 typically comprises a number of intermediate devices (not shown) between devices 1 and 2 and between devices 1 and 3, respectively. Because their presence is not necessary for an understanding of the present invention, the intermediate devices have been omitted from FIGS. 1A-1C. At some point in time it becomes necessary to create one or more bi-directional LSPs within network 100 using at least devices 1-3.

Figure 1B:
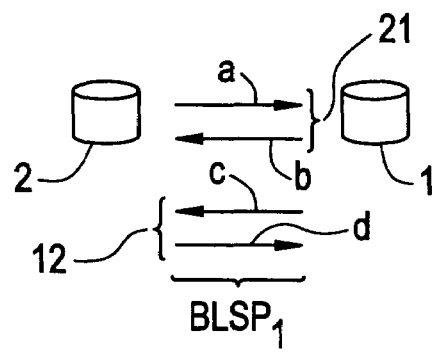
FIG. 1B depicts the creation of a bi-directional LSP between a source device and a network device in accordance with one embodiment of the present invention.

Referring to FIG. 1B, there is shown a bi-directional LSP, denoted $BLSP_1$, between network device 2 operating as a source device and network device 1 operating as a destination device. Though referred to in the singular, it should be understood that the bi-directional BLSP1 actually comprises two separate LSPs; a forward LSP 21 and a backward LSP 12. Though the network device 2 is operating as a source device and the network device 1 is operating as a destination device in FIG. 1B, it should again be understood that each of these devices may operate as a source, destination or source and destination device. Network devices 1 and 2 have been so designated as destination and source devices, respectively, only for the purpose of making the explanation of features of the present invention easier to understand.

In one embodiment of the present invention, bi-directional $BLSP_1$ is created as follows. Source device 2 is operable to generate and send an initial, forward path request message, a, to network device 1 in order to initiate the establishment of a forward LSP. Upon receiving this path request message, device 1 is operable to generate and send a forward path reservation message, b, to the source device 2 (sometimes referred to as just "source"). In this manner, a forward LSP is created between the source 2 and network device 1.

In one embodiment of the present invention, the initial, forward path request message also contains "backward path parameters". These parameters are used by the device 1 to initiate the creation of a backward LSP. In one embodiment of the present invention, the network device 1 uses the backward path parameters to generate and send a backward path request message, c, to the source device 2. This request message is separately generated from the forward path request message prepared by the source device 2. It can be said then, that the forward and backward LSPs are generated using separately generated forward and backward path request messages. This separate generation of request messages leads to the separate generation of a forward and backward LSP all of which may be carried out by MPLS-based devices. Continuing, upon reception of a backward path reservation message, d, by device 1 a backward LSP is created.

In the discussion above it was mentioned that backward path parameters contained within the initial forward path request message a are used to initiate the steps necessary to create a backward LSP. How this occurs is worthy of some additional discussion. The backward path parameters may comprise one or more of the following: a bi-directional LSP indicator, a QoS indicator and/or routing information. The presence of the bi-directional LSP indicator informs a destination device that such an LSP needs to be set up, triggering the destination device to generate a backward path request message or the like.

Though this indicator must always be present within the parameters to initiate the creation of a bi-directional LSP, the parameters may not always contain QoS indicators or routing information.

When a request message contains routing information within the path parameters, the receiving device (e.g., destination device) must use this routing information to set up a backward LSP. When, however, no routing information is contained within the path parameters, the destination device is operable to query a local database associated with the device to obtain routing information.

The information selected by the destination device from within the database is affected by the presence or absence of a QoS indicator within the path parameters. For example, if such an indicator is sent within the parameters, then the destination device is operable to select routing information which meets the same QoS (e.g., selects nodes which offer the same QoS to be a part of the backward LSP). If, however, no QoS indicator is present within the path parameters, then the destination device is further operable to select routing information which corresponds to a "best efforts" route (e.g., nodes which provide some minimum or average QoS).

At some point in time after the bi-directional BLSP, is created, there may come a time when it is necessary to terminate or otherwise delete this bi-directional LSP. In yet further embodiments of the invention, both devices 1 and 2 are operable to generate delete path messages in order to delete the bi-directional LSP.

More specifically, device 1 is operable to generate and send a first delete path message to the source device 2 and to receive a second delete path message from the source device 2 in order to delete the bi-directional $LSP_1$. It should be understood that the order in which the delete path messages are sent or received is not important to the deletion of the bi-directional LSP. That is to say, the first delete path message generated by the network device 1 may be sent to the source 2 before or after the network device 1 receives the second delete path message from the source device 2. In addition, the generation of the second message may not be triggered by the reception of the first message. The designations "first" and "second" are not meant to imply a chronological order necessarily. Instead, these designations are used only to point out that two separate messages need to be sent before a bi-directional LSP is deleted.

Figure 1C:
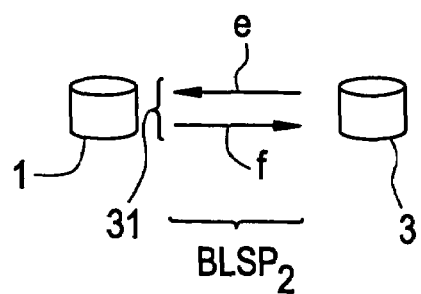
FIG. 1C depicts the creation of a bi-directional LSP between a destination device and a network device according to another embodiment of the present invention.

As indicated initially above, the network device 1 is operating as a destination device located at a destination node or the like. Alternatively, device 1 can also operate as a source device. In a further embodiment of the present invention, when the device 1 operates as a source device it may be operable to initiate the creation of a bi-directional LSP in between itself and device 3 which is operating as a destination device. Referring to FIG. 1C, there is shown a bi-directional LSP, $BLSP_2$, in between device 1 and destination device 3. To avoid being repetitious, but to make the example shown in FIG. 1C more understandable, only backward LSP 31 of bi-directional $BLSP_2$ is shown. It should be understood, however, that $BLSP_2$ also comprises a bundled, forward LSP.

$BLSP_2$ may be created as follows. Device 1 is operable to separately generate and send a backward path reservation message, f; to the destination device 3 after receiving a backward path request message, e, from the destination device 3. Once the destination device 3 receives the backward path reservation message, backward LSP 31 is created between the device 1 and destination device 3. It should be understood that the device 1 has separately generated and sent a forward path request message, e, to the destination device 3 in order to establish the forward LSP (not shown) between the device 1 and destination device 3. As before, these separately generated forward and backward LSPs form a bi-directional LSP, $BLSP_2$, between device 1 and destination device 3. Similar to the bi-directional LSP shown in FIG. 1B, the bi-directional $BLSP_2$ may be deleted when both devices 1 and 3 generate and send delete path messages to one another. It should be understood that the delete path messages sent by both devices 1 and 3 may be sent in any order provided the order results in the deletion of the bi-directional $BLSP_2$.

In an alternative embodiment of the invention, the forward and backward LSPs which comprise the bi-directional $BLSP_2$ may in fact comprise the same path. In yet another embodiment, the backward path may be created first, followed by the forward path.

The above discussion has set forth some examples of the ideas envisioned by the present invention. Practically speaking, it is impossible to set forth each and every example. Variations of the examples given above are considered to be within the spirit and scope of the present invention, the scope of which is more aptly defined by the claims which follow.

We claim:

1. A network device operable to:
    by itself generate and send in a transmission section a backward path request message to a source of a separately generated, initial forward path request message associated with a forward Label Switched Path (LSP) between the device and the source; and
    receive in a receiving section a backward path reservation message from the source in order to establish a backward LSP between the device and the source, wherein the separately established forward and backward LSPs form a bi-directional LSP between the device and the source.

2. The device as in claim 1 further operable to generate and send an initial, forward path reservation message to the source in order to establish the forward LSP after receiving the initial forward path request message.

3. The device as in claim 1 further operable to generate and send a backward path reservation message to a destination after receiving a backward path request message from the destination in order to establish a backward LSP between the device and the destination.

4. The device as in claim 3 further operable to separately generate and send a forward path request message to the destination in order to establish a forward LSP between the device and the destination, wherein the separately established forward and backward LSPs between the device and the destination form a bi-directional LSP between the device and the destination.

5. The device as in claim 1 wherein the forward and backward LSPs between the device and source comprise the same path.

6. The device as in claim 4 wherein the forward and backward LSPs between the device and destination comprise the same path.

7. The device as in claim 1 further operable to generate the backward path request message based on backward path parameters contained in the initial forward path request message.

8. The device as in claim 7 further operable to query a local database to obtain routing information in order to generate the backward path request message.

9. The device as in claim 7 further operable to generate the backward path request message based on a quality-of-service (QoS) indicator contained within the parameters.

10. The device as in claim 7 further operable to generate the backward path request message based on best effort routing information when a QoS indicator is not contained within the parameters.

11. The device as in claim 7 wherein the traffic parameters comprise a bi-directional LSP indicator and a QoS indicator.

12. The device as in claim 1 further operable to request backward traffic parameters from the source when the initial path request message does not contain such parameters.

13. The device as in claim 1 further operable to generate and send a first delete path message to the source and to receive a second delete path message from the source in order to delete the bi-directional LSP.

14. The device as in claim 13 further operable to send the first delete path message to the source before receiving the second delete path message from the source.

15. The device as in claim 13 further operable to send the first delete path message to the source after receiving the second delete path message from the source.

16. A network device operable to:
by itself generate in a transmission section and send a backward path reservation message to a destination after receiving in a receiving section a backward path request message of a separately generated, initial forward path request message associated with a forward Label Switched Path (LSP) from the destination in order to establish a backward LSP between the device and the destination.

17. The device as in claim 16 further operable to separately generate and send a forward path request message to the destination in order to establish a forward LSP between the device and the destination, wherein the separately established forward and backward LSPs between the device and the destination form a bi-directional LSP between the device and the destination.

18. The device as in claim 16 further operable to generate and send a first delete path message to the destination and to receive a second delete path message from the destination in order to delete the bi-directional LSP.

19. The device as in claim 18 further operable to send the first delete path message to the destination before receiving the second delete path message from the destination.

20. The device as in claim 18 further operable to send the first delete path message to the destination after receiving the second delete path message from the destination.

21. A method for creating a bi-directional LSP comprising the steps of:
generating and sending an independent backward path request message to a source of a separately generated, initial forward path request message associated with a forward Label Switched Path (LSP) between the device and the source; and
receiving a backward path reservation message from the source in order to establish a backward LSP between the device and the source, wherein the separately established forward and backward LSPs form a bi-directional LSP between the device and the source.

22. The method as in claim 21 further comprising the steps of generating and sending an initial, forward path reservation message to the source in order to establish the forward LSP after receiving the initial forward path request message.

23. The method as in claim 21 further comprising the steps of generating and sending an independent backward path reservation message to a destination after receiving a backward path request message from the destination in order to establish a backward LSP between the device and the destination.

24. The method as in claim 23 further comprising the steps of separately generating and sending a forward path request message to the destination in order to establish a forward LSP between the device and the destination, wherein the separately established forward and backward LSPs between the device and the destination form a bi-directional LSP between the device and the destination.

25. The method as in claim 21 further comprising the step of generating the backward path request message based on backward path parameters contained in the initial forward path request message.

26. The method as in claim 25 further comprising the step of querying a local database to obtain routing information in order to generate the backward path request.

27. The method as in claim 25 further comprising the step of generating the backward path request message based on a quality-of-service (QoS) indicator contained within the parameters.

28. The method as in claim 25 further comprising the step of generating the backward path request message based on best effort routing information when a QoS indicator is not contained within the parameters.

29. The method as in claim 25 wherein the traffic parameters comprise parameters selected from the group consisting of a bi-directional LSP indicator and a QoS indicator.

30. The method as in claim 21 further comprising the step of requesting backward traffic parameters from the source.

31. The method as in claim 21 further comprising the steps of generating and sending a first delete path message to the source and receiving a second delete path message from the source in order to delete the bi-directional LSP.

32. The method as in claim 31 further comprising the step of sending the first delete path message to the source before receiving the second delete path message from the source.

33. The method as in claim 31 further comprising the step of sending the first delete path message to the source after receiving the second delete path message from the source.

34. A method for creating a bi-directional LSP comprising the steps of by a network device generating and sending a backward path reservation message to a destination after receiving a backward path request message of a separately generated, initial forward path request message associated with a forward Label Switched Path (LSP) from the destination in order to establish a backward LSP between the device and the destination.

35. The method as in claim 34 further comprising the steps of separately generating and sending a forward path request message to the destination in order to establish a forward LSP between the device and the destination, wherein the separately established forward and backward LSPs between the device and the destination form a bi-directional LSP between the device and the destination.

36. The method as in claim 35 wherein the forward and backward LSPs between the device and destination comprise the same path.

37. The method as in claim 34 further comprises the steps of generating and sending a first delete path message to the destination and to receive a second delete path message from the destination in order to delete the bi-directional LSP.

38. The method as in claim 37 further comprising the step of sending the first delete path message to the destination before receiving the second delete path message from the destination.

39. The method as in claim 37 further comprising the step of sending the first delete path message to the destination after receiving the second delete path message from the destination.

40. A network device comprising:
   means for generating and sending a backward path request message to a source of a separately generated, initial forward path request message associated with a forward Label Switched Path (LSP) between the device and the source; and
   means for receiving a backward path reservation message from the source in order to establish a backward LSP between the device and the source, wherein the separately established forward and backward LSPs form a bi-directional LSP between the device and the source.

41. The device as in claim 40 further comprising means for generating and sending an initial, forward path reservation message to the source in order to establish the forward LSP after receiving the initial forward path request message.

42. The device as in claim 40 further comprising means for generating and sending a backward path reservation message to a destination after receiving a backward path request message from the destination in order to establish a backward LSP between the device and the destination.

43. The device as in claim 42 further comprising means for separately generating and sending a forward path request message to the destination in order to establish a forward LSP between the device and the destination, wherein the separately established forward and backward LSPs between the device and the destination form a bi-directional LSP between the device and the destination.

44. The device as in claim 40 further comprising means for generating the backward path request message based on backward path parameters contained in the initial forward path request message.

45. The device as in claim 44 further comprising means for querying a local database to obtain routing information in order to generate the backward path request.

46. The device as in claim 44 further comprising means for generating the backward path request message based on a quality-of-service (QoS) indicator contained within the parameters.

47. A network device comprising means for by itself generating and sending a backward path reservation message to a destination after receiving a backward path request message of a separately generated, initial forward path request message associated with a forward Label Switched Path (LSP) from the destination in order to establish a backward LSP between the device and the destination.

48. The device as in claim 47 further comprising means for separately generating and sending a forward path request message to the destination in order to establish a forward LSP between the device and the destination, wherein the separately established forward and backward LSPs between the device and the destination form a bi-directional LSP between the device and the destination.

* * * * *

UNITED STATES PATENT AND TRADEMARK OFFICE
CERTIFICATE OF CORRECTION

PATENT NO. : 7,596,140 B2
APPLICATION NO. : 10/613104
DATED : September 29, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1834 days.

Signed and Sealed this

Twenty-eighth Day of September, 2010

David J. Kappos
*Director of the United States Patent and Trademark Office*